US008984590B2

(12) United States Patent
Cherian et al.

(10) Patent No.: US 8,984,590 B2
(45) Date of Patent: Mar. 17, 2015

(54) ENABLING ACCESS TO KEY LIFETIMES FOR WIRELESS LINK SETUP

(71) Applicant: Qualcomm Incorporated, San Diego, CA (US)

(72) Inventors: George Cherian, San Diego, CA (US); Anand Palanigounder, San Diego, CA (US); Santosh Paul Abraham, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/670,372

(22) Filed: Nov. 6, 2012

(65) Prior Publication Data

US 2013/0117820 A1  May 9, 2013

Related U.S. Application Data

(60) Provisional application No. 61/556,921, filed on Nov. 8, 2011.

(51) Int. Cl.
*G06F 7/04* (2006.01)
*G06F 15/16* (2006.01)
*G06F 17/30* (2006.01)
*H04L 29/06* (2006.01)
(Continued)

(52) U.S. Cl.
CPC ............ *H04W 12/06* (2013.01); *H04L 63/068* (2013.01); *H04L 63/08* (2013.01); *H04L 63/06* (2013.01); *H04L 63/162* (2013.01); *H04W 12/04* (2013.01); *H04L 2209/80* (2013.01)
USPC .......................................................... 726/4

(58) Field of Classification Search
CPC ....... H04L 9/08; H04L 29/06; H04L 2209/80; H04L 63/068; H04L 63/08; H04W 12/04; H04W 12/06
USPC ........... 726/2–10, 21; 380/247–249, 273, 277
See application file for complete search history.

(56) References Cited

U.S. PATENT DOCUMENTS 8,006,089 B2    8/2011  Ohba
8,031,872 B2 *  10/2011  Bakshi ........................... 380/247
8,356,176 B2 *  1/2013  Salomone ...................... 713/168
(Continued)

FOREIGN PATENT DOCUMENTS

WO    2006132540 A1   12/2006

OTHER PUBLICATIONS

Narayanan, et al., "EAP Extensions for EAP Re-Authentication Protocol (ERP)", Network Working Group—Request for Comments: 5296, Qualcomm, Inc., Aug. 2008, pp. 1-43.
(Continued)

*Primary Examiner* — Dede Zecher
*Assistant Examiner* — Vadim Savenkov
(74) *Attorney, Agent, or Firm* — Joseph S. Hanasz

(57) ABSTRACT

A particular method includes performing a bootstrapped extensible authentication protocol (EAP) re-authentication protocol (ERP) re-authentication at a mobile device after performing an EAP authentication with the access point prior to expiration of a master session key (MSK) associated with the EAP authentication. Another particular method includes performing, at an access point, a bootstrapped ERP re-authentication of a mobile device without interrupting a flow of data packets with respect to the mobile device.

20 Claims, 7 Drawing Sheets

(51) Int. Cl.
*H04W 12/06* (2009.01)
*H04W 12/04* (2009.01)

(56) References Cited

U.S. PATENT DOCUMENTS

| | | |
|---|---|---|
| 2003/0030581 A1* | 2/2003 | Roy ............................ 342/36 |
| 2004/0157584 A1* | 8/2004 | Bensimon et al. ............ 455/411 |
| 2006/0146752 A1* | 7/2006 | Jang et al. .................... 370/331 |
| 2007/0230453 A1 | 10/2007 | Giaretta et al. |
| 2008/0141031 A1 | 6/2008 | Oba et al. |
| 2008/0195861 A1 | 8/2008 | Salomone |
| 2009/0019284 A1 | 1/2009 | Cho et al. |
| 2009/0172403 A1 | 7/2009 | Liang et al. |
| 2009/0240944 A1* | 9/2009 | Cho et al. .................... 713/175 |

OTHER PUBLICATIONS

Cherian, et al., "Fast Authentication in TGai", doc.: IEEE 802.11-11/1160r2, Sep. 6, 2011, Qualcomm, pp. 1-14.
Congdon P., et al., "IEEE 802.1 X Remote Authentication Dial in User Service (RADIUS) Usage Guidelines; rfc3580.txt", Sep. 1, 2003, XP015009362, pp. 1-30, ISSN: 0000-0003.
International Search Report and Written Opinion—PCT/US2012/064076—ISA/EPO—Apr. 15, 2013.
Wu Q., et al., "EAP Extensions for EAP Re-authentication Protocol (ERP); draft-ietf-hokey-rfc5296bis-04.txt", EAP Extensions for EAP Re-Authentication Protocol (ERP); Draft-Ietf-Hokey-RFC5296BIS-04.Txt, Internet Engineering Task Force, IETF; Standardworkingdraft, Internet Society (ISOC) 4, Rue Des Falaises CH-1205 Geneva, Switzerland, No. 4, Jul. 11, 2011, pp. 1-44, XP015077225.

* cited by examiner

ENABLING ACCESS TO KEY LIFETIMES FOR WIRELESS LINK SETUP

CROSS-REFERENCE TO RELATED APPLICATIONS

The present application claims priority from commonly owned U.S. Provisional Patent Application No. 61/556,921 filed Nov. 8, 2011, the contents of which are expressly incorporated herein by reference in their entirety.

FIELD OF THE DISCLOSURE

The present disclosure relates to wireless communication systems.

BACKGROUND

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Many such wireless telephones incorporate additional devices to provide enhanced functionality for end users. For example, a wireless telephone can also include a digital still camera, a digital video camera, a digital recorder, and an audio file player. Also, such wireless telephones can execute software applications, such as a web browser application that can be used to access the Internet. As such, these wireless telephones can include significant computing capabilities.

A mobile communication device, such as a wireless phone, may include wireless networking (e.g., Wi-Fi) capability. For example, the device may search for available wireless networks and may connect to a particular wireless network that is available. Wireless networks may be secured or unsecured. When the wireless network is secured, the device may also "remember" authentication details associated with the wireless network (e.g., a network password) so that subsequent connections to the wireless network may be setup faster. Sometimes, a mobile device may transition in and out of a particular wireless network coverage area within a short amount of time. For example, a train passenger having a Wi-Fi enabled device may enter and leave a particular railway station's Wi-Fi coverage area within a matter of minutes, if not seconds. Typical authentication methods may not be fast enough (e.g., may involve too many message exchanges) to enable the device to setup an authenticated Wi-Fi session and send/receive data in such a short period of time.

Wireless networks can implement security using various authentication protocols. One example of an authentication protocol is extensible authentication protocol (EAP). When used for wireless network authentication, EAP may involve exchange of multiple messages between a mobile device, an access point, and an authentication server. To make subsequent re-authentications faster, request for comments (RFC) 5296 defines EAP re-authentication protocol (ERP), which may enable faster re-authentications under certain conditions after a full EAP authentication has been performed. During an ERP re-authentication, various keys may be generated and used. The keys may be associated with validity time periods (e.g., lifetimes), and may expire when the validity time periods have elapsed. Because the mobile device may be unaware of the key lifetimes, the mobile device may attempt to initiate an ERP re-authentication even though the keys have expired. Upon determining that the ERP re-authentication was unsuccessful, the mobile device may initiate a full EAP authentication and generate new keys. However, the additional messaging round trip(s) involved in the unsuccessful ERP re-authentication may increase an overall link setup time of the mobile device.

SUMMARY

A method and apparatus to enable access to key lifetimes for wireless link setup are disclosed. Certain embodiments may include bundling authentication and internet protocol (IP) address assignment into wireless link setup. The proposed techniques may provide a mobile station (STA) with key lifetime information so that the mobile device may determine prior to initiating an ERP re-authentication whether the ERP re-authentication would be unsuccessful due to expired key(s). Thus, the STA may be able to avoid messaging delay caused by such unsuccessful ERP re-authentications.

Key lifetime information may be provided to the STA in multiple ways. For example, in a first implementation, the STA may be programmed to perform a bootstrapped ERP re-authentication shortly after a full EAP authentication, even in situations where the EAP authentication and the ERP re-authentication are performed with respect to the same wireless access point (AP). The STA may request and receive key lifetime information during the bootstrapped ERP re-authentication. The AP may indicate to the STA whether or not bootstrapped ERP re-authentications are supported, as well as what types of IP addresses and IP address assignment methods are supported, in a beacon or control message. In addition, the AP may conduct the bootstrapped ERP re-authentication without interrupting IP traffic flow with respect to the STA.

As another example, in a second implementation, the STA may use a re-authentication Root Key (rRK) lifetime request during EAP authentication to indicate that the STA is interested in ERP re-authentications and to request a rRK lifetime. Upon receiving the rRK lifetime request, an authentication server may send the requested rRK lifetime to the STA (e.g., via the AP).

In a third implementation, key lifetime information may be pre-configured at the STA. For example, a default rRK timer value may be stored in a non-volatile memory (e.g., subscriber identity module (SIM)) of the STA and may be accessed during provisioning. If an ERP re-authentication based on the rRK timer value is unsuccessful, the STA may change (e.g., reduce) the rRK timer value in an attempt to avoid subsequent unsuccessful ERP re-authentications.

In a particular embodiment, a method includes receiving at least one message at a mobile device from an access point and performing an EAP authentication after receiving the at least one message. The method also includes performing a bootstrapped ERP re-authentication at the mobile device after performing the EAP authentication. The bootstrapped ERP re-authentication is performed before a master session key (MSK) associated with the EAP authentication expires.

In another particular embodiment, a method includes performing at a mobile device an EAP authentication with an access point. The method also includes performing a bootstrapped ERP re-authentication at the mobile device, where the bootstrapped ERP re-authentication is performed responsive to an indication of completion of the EAP authentication.

In another particular embodiment, a method includes performing, at an access point, a bootstrapped ERP re-authentication of a mobile device without interrupting a flow of data packets with respect to the mobile device.

In another particular embodiment, an access point includes a traffic port configured to communicate data packets with respect to a mobile device. The access point also includes an authentication port configured to conduct a bootstrapped ERP re-authentication of the mobile device without interrupting the communication of the data packets via the traffic port.

In another particular embodiment, a method includes transmitting, from a mobile device, a first EAP message that includes a request for a rRK lifetime. The method also includes receiving a second EAP message at the mobile device, where the second EAP message includes the requested rRK lifetime. For example, the first EAP message may include an EAP-Initiate message and the second EAP message may include an EAP-Finish message.

In another particular embodiment, a method includes receiving, at an authentication server, a first EAP message that includes a request for a rRK lifetime. The method also includes transmitting, from the authentication server, a second EAP message that includes the requested rRK lifetime.

In another particular embodiment, a method includes determining, at a mobile device, whether to perform an EAP authentication or a bootstrapped ERP re-authentication based on whether a stored rRK lifetime has elapsed. The rRK lifetime is stored in a non-volatile memory within the mobile device.

In another particular embodiment, a non-transitory processor-readable medium includes instructions that, when executed by a processor, cause the processor to transmit, from a mobile device, a first EAP message that includes a request for a rRK lifetime. The instructions, when executed by the processor, also cause the processor to receive, at the mobile device, a second EAP message that includes the requested rRK lifetime.

One particular advantage provided by at least one of the disclosed embodiments is an ability to provide key lifetime information to mobile devices so that mobile devices may predict whether or not an ERP re-authentication will fail. By avoiding or reducing occurrence of failed ERP re-authentications, a faster initial link setup time may be achieved. Another particular advantage provided by at least one of the disclosed embodiments is an ability to conduct one or more additional ERP re-authentications without interrupting an existing internet protocol (IP) session between a mobile device and an access point.

Other aspects, advantages, and features of the present disclosure will become apparent after review of the entire application, including the following sections: Brief Description of the Drawings, Detailed Description, and the Claims.

DETAILED DESCRIPTION

Institute of Electrical and Electronics Engineers (IEEE) 802.11 task group (TG) ai (hereinafter "TGai") is a task group involved in the study of fast initial link setup (FILS). TGai proposes the use of ERP for FILS. TGai submissions and proposals may be available from the IEEE 802 standards committee at www.ieee802.org. In accordance with TGai submission(s), a mobile station (STA) may be unaware of any authentication context upon power-up. To setup an authenticated session with an access point (AP), the STA may perform a full EAP authentication with the AP, which may also involve communication with an authentication server (AS). The full EAP authentication may include establishing various keys at the STA, including an extended master session key (EMSK) a domain-specific root key (DSRK), a re-authentication Root Key (rRK), a re-authentication Integrity Key (rIK), and a master session key (MSK). The EMSK, the DSRK, the rRK, and the rIK may also be established at the AS, and the MSK may be established at both the AP and the AS. Generally, a new rRK and rIK may be generated each time a full EAP is performed. It should be noted that although various keys may be established at the STA during EAP authentication, the STA may not be provided information regarding the lifetimes of the keys.

When the STA switches to a new AP, the STA may attempt to perform an ERP re-authentication with the new AP. The EAP re-authentication may be faster than the full EAP authentication (e.g., because certain keys may be reused). Each time ERP re-authentication is successful, a new re-authentication master session key (rMSK) may be established at the STA, the AP, and the AS. ERP re-authentication may be performed each time the STA moves to a new AP or when the rMSK expires. However, when the STA disconnects and then reconnects with the same AP, ERP re-authentication may not be performed. Should ERP re-authentication fail (e.g., because the rRK has expired), the STA may perform another full EAP authentication.

Thus, in certain TGai proposals, the STA may be "reactive" in determining whether to perform the full EAP authentication or the ERP re-authentication, because the STA may perform the full EAP authentication "in reaction" to unsuccessful ERP re-authentication. ERP timer(s) and key lifetimes may be maintained by the AS. In contrast, the disclosed systems and methods may enable a "proactive" determination of whether to perform a full EAP authentication or an ERP re-authentication by providing key lifetime information (e.g., rRK and/or rMSK lifetime information) to the STA.

Figure 1:
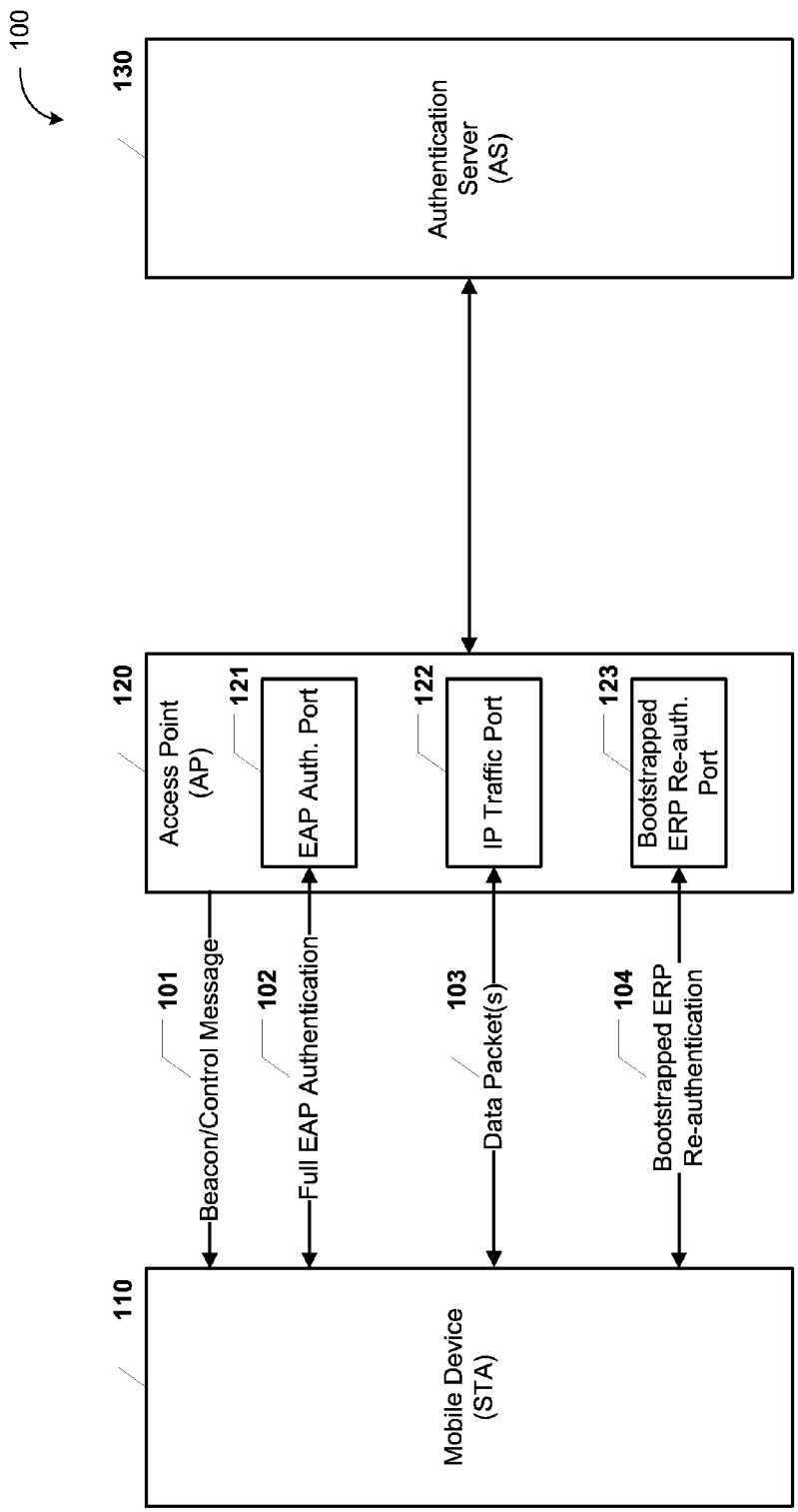
FIG. 1 is a diagram of a first embodiment of a system operable to enable access to key lifetimes for wireless link setup.

Referring to FIG. 1, a first embodiment of a system 100 operable to enable access to key lifetimes for wireless link setup is shown. The system 100 includes a mobile device (designated STA) 110, an access point (designated AP) 120, and an authentication server (designated AS) 130. It should be noted that although FIG. 1 depicts a single access point 120, any number of access points may be present in the system 100.

The mobile device 110 may be an electronic device operable to send and receive data via a wireless network. For example, the mobile device 110 may be a wireless phone, a PDA, a portable computing device, a tablet computing device, a portable media player, or any combination thereof.

The access point 120 may be a node of a wireless network such as an IEEE 802.11 (Wi-Fi) access point that is associated with a Wi-Fi network. The access point 120 may include a plurality of ports, including at least one authentication port and at least one traffic port. The authentication port(s) may be configured to send and receive messages related to authentication procedures to and from mobile devices (e.g., the mobile device 110). The traffic port(s) may be configured to send and receive data traffic messages to and from mobile devices (e.g., the mobile device 110). In one embodiment, distinct authentication and/or traffic port(s) may be allocated for each mobile device that is connected to the access point 110. For example, in the example of FIG. 1, the access point 120 includes two authentication ports (EAP authentication port 121 and bootstrapped ERP re-authentication port 123) and one traffic port (IP traffic port 122) allocated to the mobile device 110.

The authentication server 130 may be a server or other computing device that can communicate with the access point 120. In particular embodiments, the access point 120 and the authentication server 130 may be integrated into a single computing device instead of being separate computing devices as illustrated in FIG. 1.

During operation, the access point 120 may transmit a message 101 to the mobile device 110, where the message 101 indicates whether or not the access point supports bootstrapped ERP re-authentications. For example, the message may be a beacon message (e.g., an IEEE 802.11 beacon message), a probe response, a control message (e.g., a management frame), or any combination thereof. An illustrative embodiment of a beacon/control message is further described with reference to FIG. 2. In a particular embodiment, the access point 110 may transmit the beacon/control message 101 to mobile device 110 when the mobile device 110 enters or re-enters a coverage area of the access point 120, periodically to the mobile device 110 while the mobile device 110 is within the coverage area of the access point 120, or any combination thereof.

The mobile device 110 and the access point 120 may perform an EAP authentication 102. In a particular embodiment, EAP authentication may also include messaging between the access point 120 and the authentication server 130. For example, the authentication server 130 may generate and transmit one or more keys (e.g., EMSK, DRSK, MSK, etc.) to the mobile device 110 via the access point 120 and/or verify one or more keys (e.g., EMSK, DRSK, MSK, etc.) generated by the mobile device 110. After the EAP authentication 102 is completed, the mobile device 110 may establish an authenticated session with the access point 120 using the one or more keys created during the EAP authentication 102. The mobile device 110 may send and receive data packets 103 via the access point 120 using the authenticated session. However, the mobile device 110 may not know how long the keys established during the EAP authentication 102 will be valid.

To access key lifetime information, the mobile device 110 may perform, before the MSK associated with the EAP authentication expires, a bootstrapped ERP re-authentication 104 with the access point 120 (if the access point 120 indicated support for such a procedure in the beacon/control message 101). Thus, the system of FIG. 1 may enable performing bootstrapped ERP re-authentication even if a mobile device has not changed to a new access point. Moreover, unlike systems that interrupt traffic flow (e.g., by disabling traffic port(s)) during authentication, the access point 120 of FIG. 1 may perform the bootstrapped ERP re-authentication 104 via the bootstrapped ERP re-authentication port 123 without interrupting communication of the data packets 103 via the IP traffic port 122 (e.g., during an existing IP session). It will be appreciated that maintaining traffic flow during the bootstrapped ERP re-authentication 104 may not pose a security risk because the full EAP authentication 102 of the mobile device 110 has been completed. When full EAP authentications are performed via the EAP authentication port 121, however, the IP traffic port 122 may be disabled for security purposes. In a particular embodiment, the bootstrapped ERP re-authentication may be an implicit bootstrapped ERP procedure or an explicit bootstrapped ERP that is performed in accordance with §5.1 of Request For Comments (RFC) 5296.

In a particular embodiment, the mobile device 110 may perform the bootstrapped ERP re-authentication 104 shortly after and/or in response to completion of the full EAP authentication 102. For example, the mobile device 110 may perform the bootstrapped ERP re-authentication 104 in response to receiving an indication of completion of the EAP authentication 102, such as an EAP Success message. The ERP re-authentication signaling exchange may be used to obtain the key lifetime information, but may not be used for rMSK rekeying.

During the bootstrapped ERP re-authentication 104, the mobile device 110 may request and receive key lifetime information. For example, the mobile device 110 may request and receive a rRK lifetime and a rMSK lifetime. When the rRK lifetime has expired, the mobile device 110 may proactively perform a full EAP authentication to generate a new rRK instead of attempting an ERP re-authentication that would be unsuccessful due to the expired rRK. When the rMSK lifetime has expired, the mobile device 110 may proactively perform an ERP re-authentication, even if the mobile device 110 has not changed access points, to generate a new rMSK.

Thus, the system 100 of FIG. 1 may provide the mobile device 110 access to key lifetime information, so that the mobile device 110 may reduce a number of unsuccessful ERP re-authentication attempts, which may decrease an overall wireless link setup time for the mobile device 110. It will be appreciated that the system 100 of FIG. 1 may be implemented by modifying mobile device and access point operation without modification to EAP and ERP standards.

To illustrate, the mobile device 110 may perform a "full" EAP authentication, during which a MSK and a rRK may be established. For example, the MSK may have a lifetime of one hour and the rRK may have a lifetime of one month. The mobile device 110 may then (e.g., prior to expiration of the MSK) perform a bootstrapped ERP re-authentication, during which a rMSK may be established and during which the mobile device 110 may receive rRK and rMSK lifetime information. For example, the rMSK may have a lifetime of one hour. During the one month lifetime of the rRK, the mobile device 110 may perform one or more quick authentications/re-authentications (e.g., FILS) that renew/extend the rMSK or establish a new one-hour rMSK. However, such quick authentications/re-authentications may fail after the one month lifetime of the rRK elapses. Advantageously, because the mobile device 110 has access to key lifetime information, the mobile device 110 may refrain from performing the quick authentication/re-authentication in response to detecting that the rRK lifetime has elapsed, and may instead perform a "full" EAP authentication to generate a new rRK.

Advantageously, because the mobile device 110 has access to key lifetime information, the mobile device 110 may proactively perform a "full" EAP authentication to generate a new rRK in an opportunistic manner. For example, before the rRK lifetime expires, the mobile device 110 may detect a no-data-activity period (e.g., in the middle of the night). In response, the mobile device 110 may initiate full-EAP authentication. Thus, in the above example, the mobile device 110 may initiate the full EAP authentication on the night before the one-month expiry of the rRK lifetime.

Figure 2:
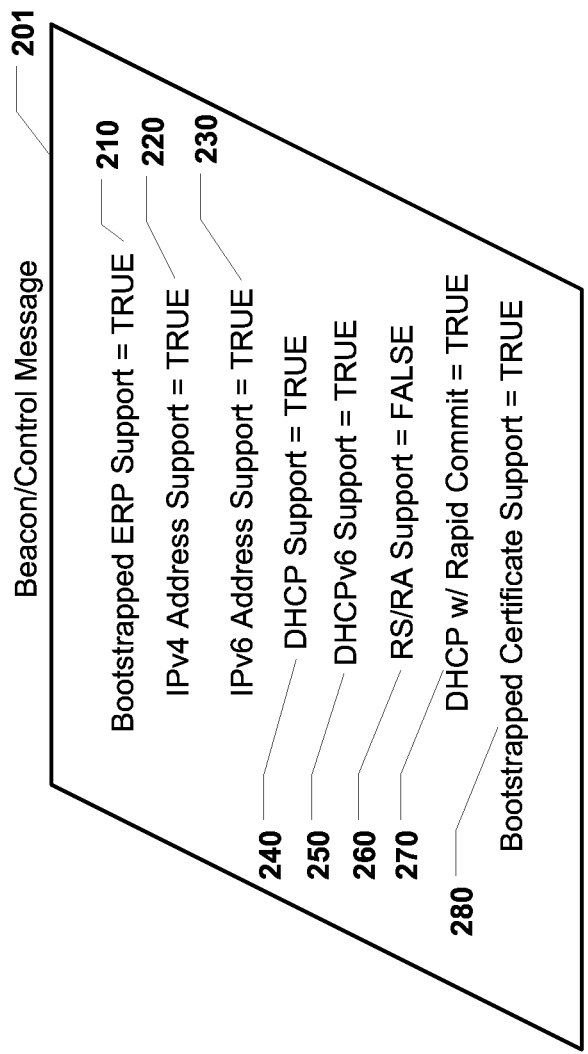
FIG. 2 is a diagram of a particular embodiment of the beacon/control message of FIG. 1.

FIG. 2 is a diagram of a particular embodiment of a beacon/control message 201. For example, the beacon/control message 201 may be the beacon/control message 101 of FIG. 1.

As described with reference to the beacon/control message 101 of FIG. 1, the beacon/control message 201 may be transmitted by an access point to a mobile device to indicate whether or not bootstrapped ERP re-authentications are supported by the access point. To illustrate, the beacon/control message 201 may include a flag 210 or other information element indicating whether bootstrapped ERP re-authentications are supported.

In a particular embodiment, the beacon/control message 201 may also indicate whether certain IP address types and IP address assignment methods are supported. It will be appreciated that because particular embodiments disclosed herein bundle authentication and IP address assignment, including such indications in the beacon/control message may be beneficial. For example, the beacon/control message 201 may include a flag 220 indicating whether the access point supports internet protocol (IP) version 4 (IPv4) IP addresses and a flag 230 indicating whether the access point supports IP version 6 (IPv6) IP addresses. The beacon/control message 201 may also include a flag 240 indicating whether the access point supports dynamic host configuration protocol (DHCP) IP address assignment, a flag 270 indicating whether the access point supports DHCP with Rapid Commit for IP address assignment, a flag 250 indicating whether the access point supports DHCP for IPv6 (DHCPv6) IP address assignment, and a flag 260 indicating whether the access point supports router solicitation (RS)/router advertisement (RA)-based IP address assignment. The beacon control message 201 may further include a flag 280 indicating whether bootstrapped operations using security certificates are supported. For example, the use of security certificates may involve a Diffie-Hellman key exchange between a mobile device and an access point or authentication server. In a particular embodiment, the flag 210 and the flag 280 may be replaced by a single flag indicating whether Fast Authentication Protocol, which involves the use of bootstrapped ERP and security certificates, is supported.

Figure 3:
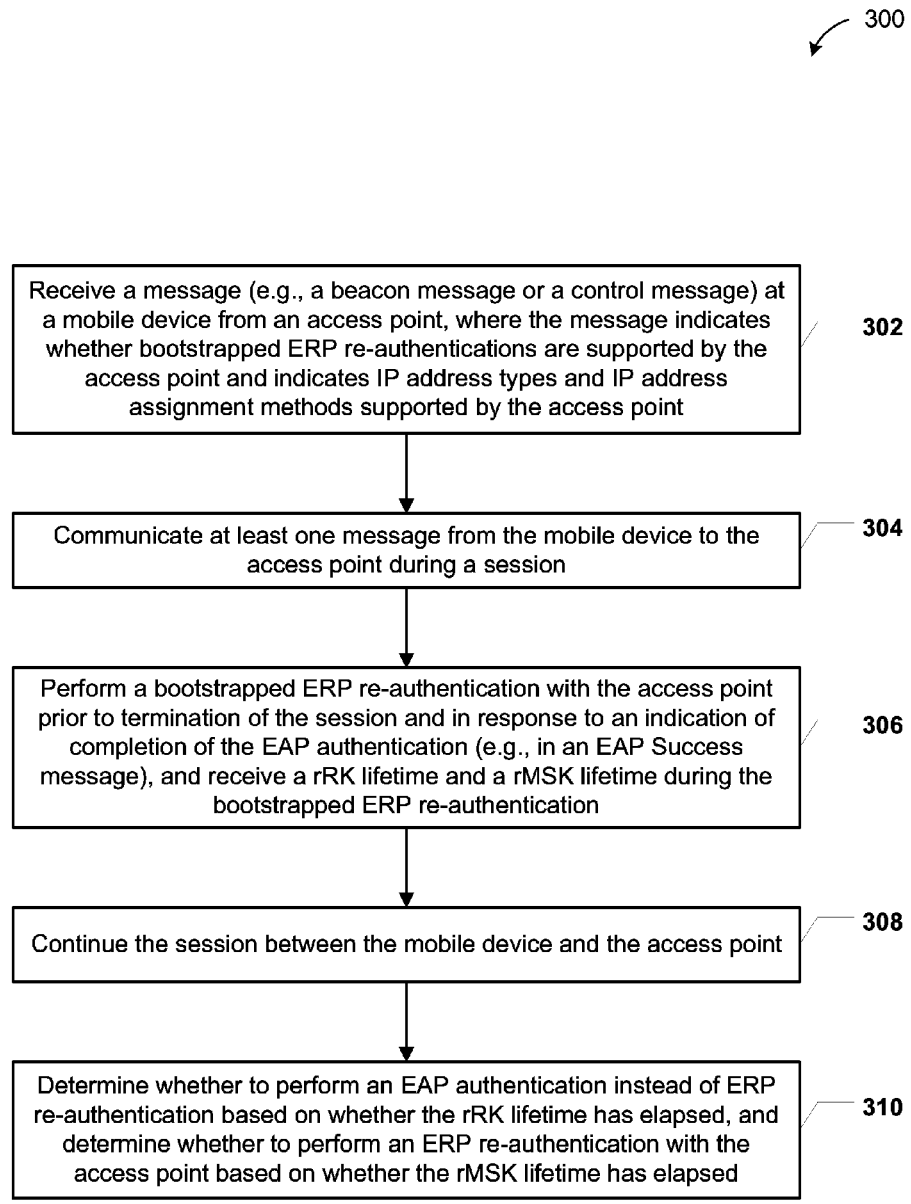
FIG. 3 is a flowchart of a particular embodiment of a method of operation of the mobile device of the system of FIG. 1.

FIG. 3 is a flowchart of a particular embodiment of a method 300 of operation of the mobile device 110 of the system 100 of FIG. 1.

The method 300 may include receiving a message at a mobile device from an access point, at 302. The message (e.g., a beacon message or a control message) may indicate whether bootstrapped ERP re-authentications are supported by the access point. The message may also indicate IP address types and IP address assignment methods supported by the access point. For example, in FIG. 1, the mobile device 110 may receive the beacon/control message 101 from the access point 120. In an illustrative embodiment, the beacon/control message may include various indicator flags or information elements, as described with reference to the beacon/control message 201 of FIG. 2.

The method 300 may also include communicating at least one message from the mobile device to the access point during a session, at 304. For example, in FIG. 1, the mobile device 110 may setup an authenticated session with the access point 120 and may communicate the one or more data packets 103 to the access point during the authenticated session.

Continuing to 306, a bootstrapped ERP re-authentication with the access point may be performed. The bootstrapped ERP re-authentication may be performed prior to termination of the session and in response to an indication of completion of the EAP authentication. For example, an EAP Success message may indicate completion of the EAP authentication. During the bootstrapped ERP re-authentication, the mobile device may receive one or more messages indicating a rRK lifetime and a rMSK lifetime. For example, in FIG. 1, the mobile device 110 may perform the bootstrapped ERP re-authentication 104 and may receive a rRK lifetime and a rMSK lifetime during the bootstrapped ERP re-authentication.

Advancing to 308, the session between the mobile device and the access point may be continued. For example, in FIG. 1, additional data packets 103 may be communicated between the mobile device 110 and the access point 120 during the session.

At 310, the mobile device may determine whether to perform an EAP authentication instead of an ERP re-authentication based on whether the rRK lifetime has elapsed. The mobile device may also determine whether to perform an ERP re-authentication with the access point (i.e., the same access point) based on whether the rMSK lifetime has elapsed.

Figure 4:
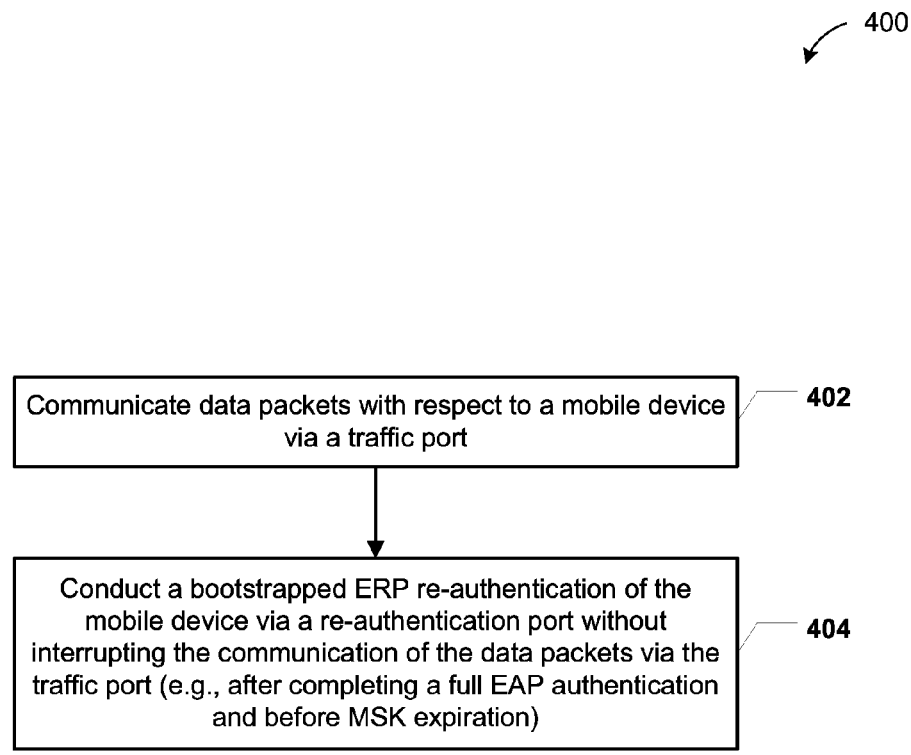
FIG. 4 is a flowchart of a particular embodiment of a method of operation of the access point of the system of FIG. 1.

FIG. 4 is a flowchart of a particular embodiment of a method of operation of the access point 120 of the system 100 of FIG. 1.

The method 400 may include communicating data packets with respect to a mobile device via a traffic port, at 402. For example, in FIG. 1, the access point 120 may communicate the data packets 103 with respect to the mobile device 110 via the IP traffic port 122.

At 404, a bootstrapped ERP re-authentication of the mobile device may be conducted via a re-authentication port without interrupting the communication of the data packets via the traffic port. In a particular embodiment, the bootstrapped ERP re-authentication may not be performed until after a full EAP authentication, because the re-authentication port may not be open until after the full EAP authentication is successfully completed. In addition, the bootstrapped ERP re-authentication may be performed before a master session key (MSK) associated with the full EAP authentication expires. For example, in FIG. 1, the access point 120 may conduct the bootstrapped ERP re-authentication 104 via the re-authentication port 123 without interrupting the communication of the data packets 103 via the IP traffic port 122.

Figure 5:
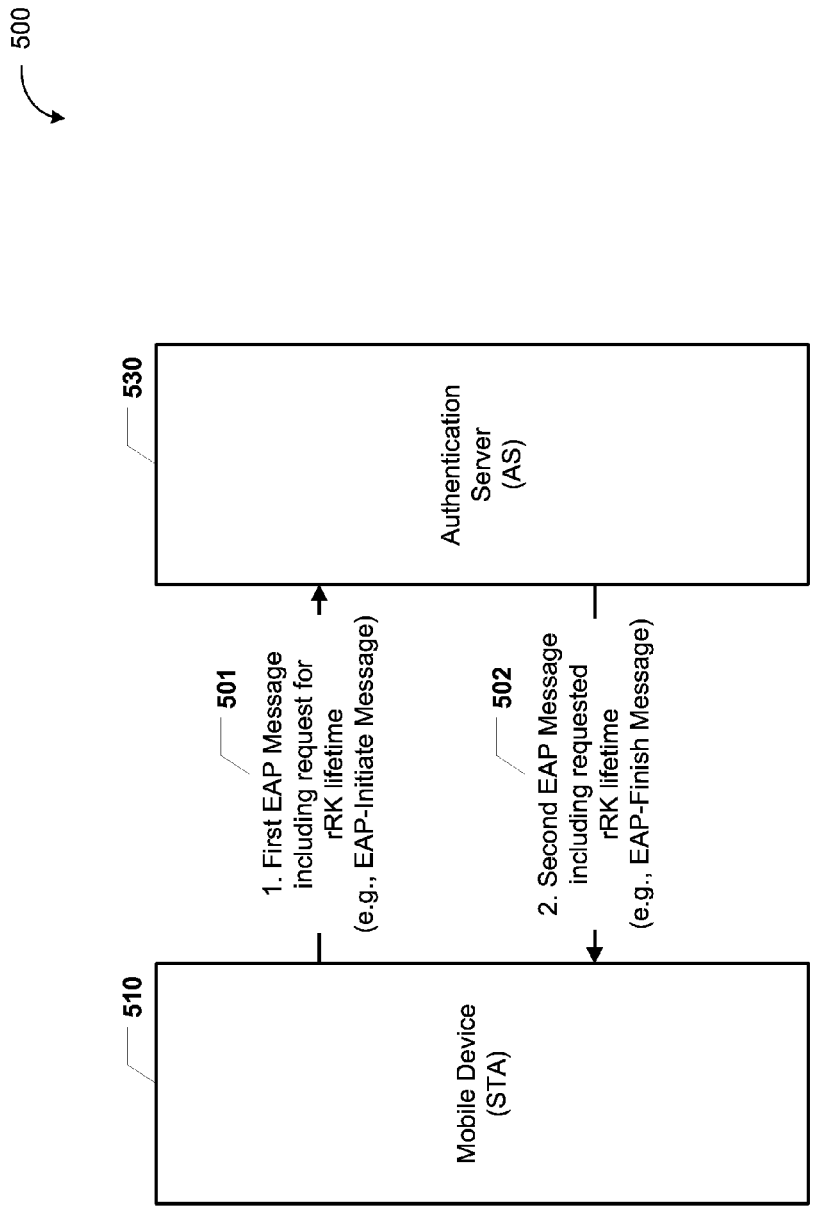
FIG. 5 is a diagram of a second embodiment of a system operable to enable access to key lifetimes for wireless link setup.

FIG. 5 is a diagram of a second embodiment of a system 500 operable to enable access to key lifetimes for wireless link setup. The system 500 may include a mobile device 510 communicably coupled to an authentication server 530. For example, the mobile device 510 may be communicably coupled to the authentication server 530 via an access point, such as the access point 120 of FIG. 1.

During operation, instead of utilizing a bootstrapped ERP re-authentication to request key lifetime information as described with reference to FIGS. 1-4, the mobile device 510 may instead request key lifetime information during a EAP authentication. For example, the mobile device 510 may transmit a first EAP message 501 to the authentication server 530, where the first EAP message includes a request for a re-authentication Root Key (rRK) lifetime. In a particular embodiment, the first EAP message 501 may be an EAP-Initiate message.

The authentication server 530 may receive the first EAP message 501 and may send a second EAP message 502 in response, where the second EAP message includes the requested rRK lifetime. In a particular embodiment, the second EAP message 502 may be an EAP-Finish message.

The system 500 of FIG. 5 may thus provide the mobile device 510 access to key lifetime information without performance of a bootstrapped ERP re-authentication procedure as in the system 100 of FIG. 1. Implementing the system 500 of FIG. 5 may involve modifying the EAP standard to add rRK lifetime request/response parameters to one or more EAP messages.

Figure 6:
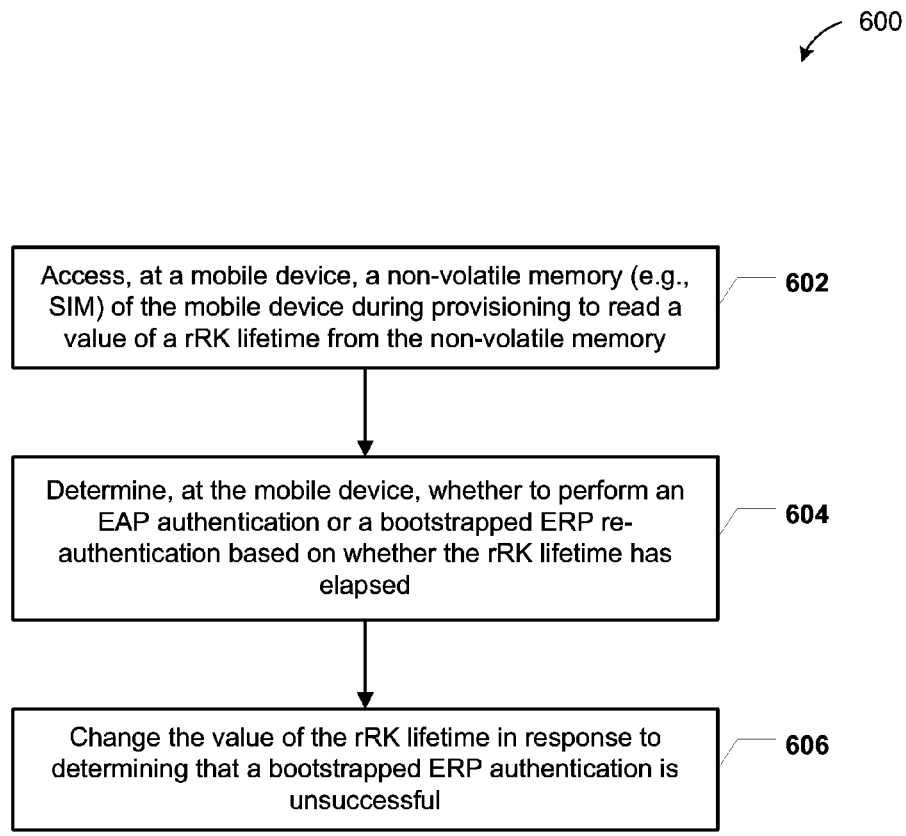
FIG. 6 is a flowchart of a particular embodiment of a method of enabling access to key lifetimes for wireless link setup that includes use key lifetime stored at a non-volatile memory of a mobile device.

FIG. 6 is a flowchart of a particular embodiment of a method 600 of enabling access to key lifetimes for wireless link setup that includes use key lifetime stored at a non-volatile memory of a mobile device. In an illustrative embodiment, the method 600 may be performed by a mobile device, such as the mobile device 110 of FIG. 1, the mobile device 510 of FIG. 5, or the mobile communication device 700 of FIG. 7.

The method 600 may include accessing, at a mobile device, a non-volatile memory of the mobile device to read a value of a rRK lifetime from the non-volatile memory, at 602. For example, the non-volatile memory may be a subscriber identity module (SIM) of the mobile device and may accessed during provisioning of the mobile device (e.g., during power-on and/or initialization).

Continuing to 604, the mobile device may determine whether to perform an EAP authentication or a bootstrapped ERP re-authentication based on whether the rRK lifetime has elapsed. At 606, the mobile device may change the value of the rRK lifetime in response to determining that a bootstrapped ERP re-authentication is unsuccessful. For example, if the SIM of the mobile device stores a "default" rRK lifetime value of ten minutes, the mobile device may store a rRK lifetime value of ten minutes in memory (e.g., random access memory (RAM)). However, if an ERP re-authentication within the ten minute lifetime is unsuccessful due to rRK expiration, the mobile device may reduce the rRK lifetime value in memory in an attempt to refine the rRK lifetime value and avoid additional unsuccessful ERP re-authentications.

Thus, the method 600 of FIG. 6 may provide a mobile device with key lifetime information that can be used to determine whether to initiate a full EAP authentication or a bootstrapped ERP re-authentication. It will be appreciated that the method 600 of FIG. 6 may be implemented without modifying EAP/ERP standards and without modifying access point/authentication server behavior Implementing the method 600 of FIG. 6 may involve pre-configuration of mobile devices and/or mobile device SIMs.

Figure 7:
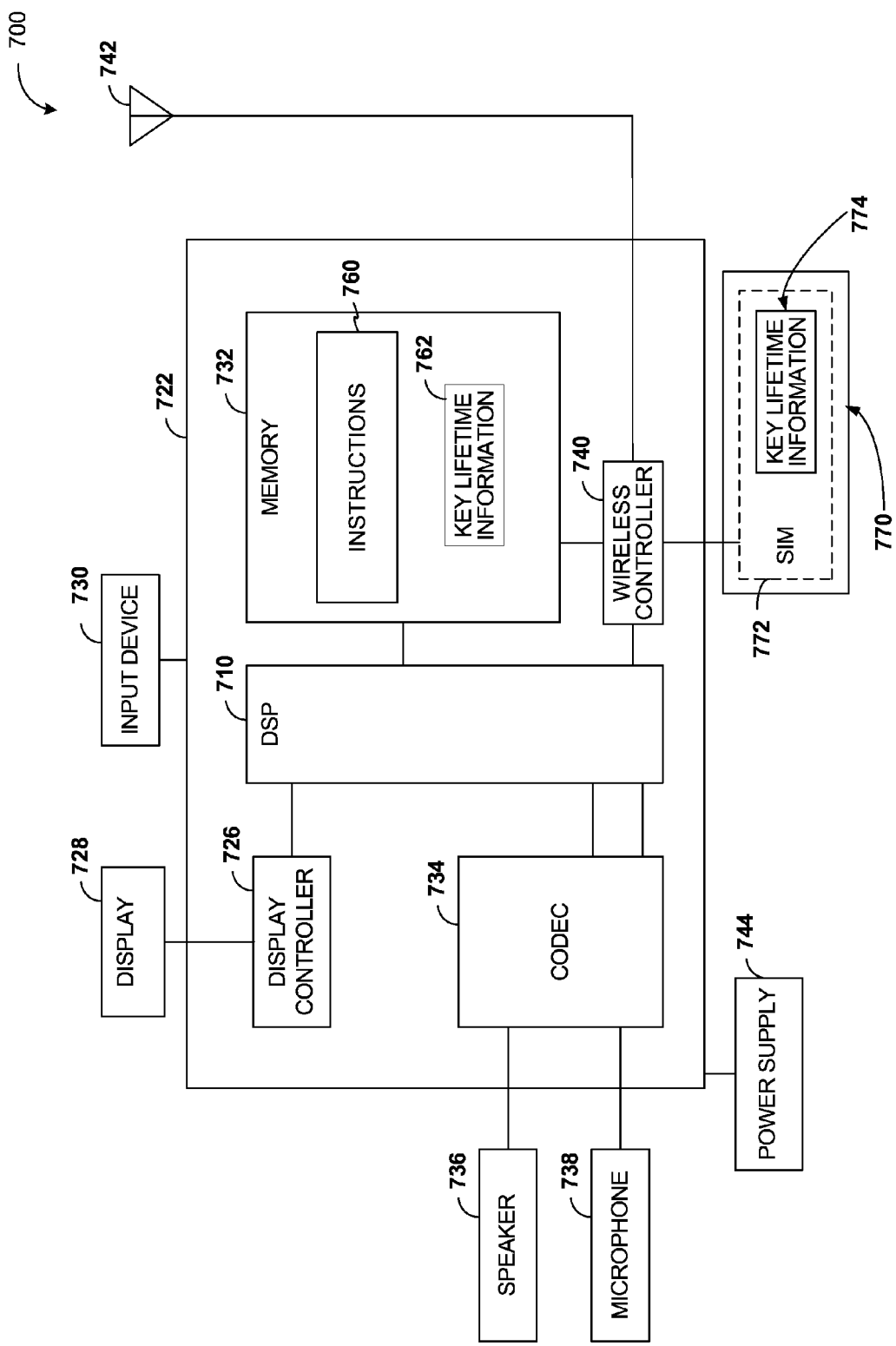
FIG. 7 is a block diagram of a wireless device including a system operable to enable access to key lifetimes for wireless link setup.

FIG. 7 is a block diagram of a mobile communication device 700. In one embodiment, the mobile communication device 700 or components thereof include or are included within the mobile device 110 of FIG. 1, the mobile device 510 of FIG. 5, or any combination thereof. Further, all or part of the methods described in FIGS. 3 and 6 may be performed at or by the mobile communication device 700. The mobile communication device 700 includes a processor 710, such as a digital signal processor (DSP), coupled to a memory 732.

The mobile communication device 700 may include a SIM interface 770 configured to receive a SIM 772. For example, the SIM interface 770 may be a SIM card connector that includes a body having an accommodating space for a SIM card and multiple connected-through receptacles for receiving conducting terminals of a received SIM card. An electrical signaling contact with the SIM card may be made through the conducting terminals and the receptacles. An example interface may include a serial or parallel (e.g., 7-pin or 8-pin) connection. Further, multiple SIM card sizes may be accommodated (e.g., full-size, mini-SIM, or micro-SIM).

FIG. 7 also shows a display controller 726 that is coupled to the processor 710 and to a display 728. A coder/decoder (CODEC) 734 can also be coupled to the processor 710. A speaker 736 and a microphone 738 can be coupled to the CODEC 734. FIG. 7 also indicates that wireless a controller 740 can be coupled to the processor 710, where the wireless controller 740 is in communication with a wireless antenna 742.

The memory 732 may be a non-transitory tangible computer-readable storage medium that stores instructions 760. The instructions 760 may be executable by the processor 710 to perform one or more functions or methods described herein, such as the methods described with reference to FIGS. 3 and 6.

In a particular embodiment, the SIM 772 may store key lifetime information 774. For example, the key lifetime information 774 may be a "default" rRK lifetime value, as described with reference to FIG. 6. Further, as described with reference to FIG. 6, the key lifetime information 774 may be copied to the memory 732 as key lifetime information 762 during provisioning.

In a particular embodiment, the processor 710, the display controller 726, the memory 732, the CODEC 734, and the wireless controller 740 are included in a system-in-package or system-on-chip device 722. In a particular embodiment, an input device 730 and a power supply 744 are coupled to the system-on-chip device 722. Moreover, in a particular embodiment, as illustrated in FIG. 7, the display device 728, the input device 730, the speaker 736, the microphone 738, the wireless antenna 742, the power supply 744, the SIM 772, and the SIM interface 770 are external to the system-on-chip device 722. However, each of the display device 728, the input device 730, the speaker 736, the microphone 738, the wireless antenna 742, the power supply 744, the SIM 772, and the SIM interface 770 can be coupled to a component of the system-on-chip device 722, such as an interface or a controller.

In a particular embodiment, one or more components or corresponding components of the mobile communication device 700 of FIG. 7 may be included in an access point and/or an authentication server. For example, an access point of a wireless network (e.g., the access point 120 of FIG. 1) may include one or more antennas (e.g., operable to communicate data packets and message associated with EAP authentication and ERP re-authentication), a processor, and a memory storing instructions executable by the processor to perform the method 400 of FIG. 4. As another example, an authentication sever of a wireless network (e.g., the authentication server 130 of FIG. 1 or the authentication server 530 of FIG. 5) may include a processor and a memory storing instructions executable by the processor to generate and/or verify keys associated with EAP authentication and/or ERP re-authentication.

In conjunction with the described embodiments, an apparatus may include means for communicating data packets with respect to a mobile device. For example, the means for communicating may include the IP traffic port 122 of FIG. 1, another device or module configured to communicate data (e.g., a network interface, controller, and/or processor), or any combination thereof.

The apparatus may also include means for conducting a bootstrapped ERP re-authentication of the mobile device without interrupting the communication of the data packets via the means for communicating. For example, the means for conducting the bootstrapped ERP re-authentication may include the bootstrapped ERP re-authentication port 123 of FIG. 1, another device or module configured to conduct a bootstrapped ERP re-authentication (e.g., a processor), or any combination thereof.

The apparatus may further include means for performing an EAP authentication of the mobile device, where the means for performing is distinct from the means for conducting. For example, the means for performing the EAP authentication may include the EAP authentication port 121 of FIG. 1, another device or module configured to perform an EAP authentication (e.g., a processor), or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal (e.g., a mobile phone or a PDA). In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments disclosed herein but is to be accorded the widest scope possible consistent with the principles and novel features as defined by the following claims.

What is claimed is:

1. A method comprising:
   receiving at least one message at a mobile device from an access point;
   after receiving the at least one message, performing at the mobile device a first extensible authentication protocol (EAP) authentication;
   after performing the first EAP authentication, performing at the mobile device a first bootstrapped EAP re-authentication protocol (ERP) re-authentication before a master session key (MSK) associated with the first EAP authentication expires;
   initiating determining, at the mobile device, whether to perform a second EAP authentication or a second bootstrapped ERP re-authentication based on whether a re-authentication Root Key (rRK) has elapsed, wherein an rRK lifetime is accessed by the mobile device; and
   reducing a value of the rRK lifetime when the second bootstrapped ERP re-authentication is performed and is unsuccessful.

2. The method of claim 1, further comprising communicating at least one second message from the mobile device to the access point during a session with the access point, wherein the first bootstrapped ERP re-authentication is performed prior to termination of the session.

3. The method of claim 1, further comprising receiving a re-authentication MSK (rMSK) lifetime during the first bootstrapped ERP re-authentication.

4. The method of claim 3, wherein initiating determining whether to perform the second EAP authentication or the second bootstrapped ERP re-authentication comprises accessing the rRK lifetime from a non-volatile memory within the mobile device.

5. The method of claim 1, wherein the rRK lifetime is stored in a non-volatile memory of the mobile device, and wherein the method further comprises accessing the rRK lifetime in the non-volatile memory during a provisioning of the mobile device.

6. A method comprising:
   receiving at least one message at a mobile device from an access point;
   after receiving the at least one message, performing at the mobile device a first extensible authentication protocol (EAP) authentication;
   after performing the first EAP authentication, performing at the mobile device a first bootstrapped EAP re-authentication protocol (ERP) re-authentication before a master session key (MSK) associated with the first EAP authentication expires;
   determining, at a mobile device, whether to perform a second EAP authentication or a second bootstrapped ERP re-authentication based on whether a re-authentication Root Key (rRK) lifetime has elapsed, wherein a value of the rRK lifetime is stored in a non-volatile memory within the mobile device;
   initiating the second bootstrapped ERP re-authentication instead of the second EAP authentication;
   determining that the second bootstrapped ERP re-authentication is unsuccessful; and
   reducing the value of the rRK lifetime in response to determining that the second bootstrapped ERP re-authentication is unsuccessful.

7. The method of claim 6, further comprising accessing the non-volatile memory during a provisioning of the mobile device, wherein the non-volatile memory stores the rRK lifetime during the provisioning.

8. The method of claim 7, wherein the non-volatile memory comprises a subscriber identity module (SIM), and wherein accessing the non-volatile memory comprises reading a value of the rRK lifetime from the SIM during the provisioning.

9. The method of claim 6, further comprising:
   initiating a third bootstrapped ERP re-authentication;
   determining that the third bootstrapped ERP re-authentication is unsuccessful; and in response to determining that the third bootstrapped ERP re-authentication is unsuccessful, changing the value of the rRK lifetime.

10. The method of claim 9, wherein changing the value of the rRK lifetime in response to determining that the third bootstrapped ERP re-authentication is unsuccessful comprises reducing the value of the rRK lifetime.

11. A non-transitory processor-readable medium comprising instructions that, when executed by a processor of a mobile device, cause the processor to:
  receive at least one message from an access point;
  after receiving the at least one message, perform a first extensible authentication protocol (EAP) authentication;
  after performing the first EAP authentication, perform a first bootstrapped EAP re-authentication protocol (ERP) re-authentication before a master session key (MSK) associated with the first EAP authentication expires;
  initiate a determination of whether to perform a second EAP authentication or a second bootstrapped ERP re-authentication based on whether a re-authentication Root Key (rRK) has elapsed, wherein an rRK lifetime is accessed by the processor; and
  reduce a value of the rRK lifetime when the second bootstrapped ERP re-authentication is performed and is unsuccessful.

12. The non-transitory processor-readable medium of claim 11, wherein the mobile device comprises a non-volatile memory, and wherein execution of the instructions further causes the processor to access the rRK lifetime from the non-volatile memory during a provisioning of the mobile device.

13. A mobile device comprising:
  a processor; and
  a memory storing instructions executable by the processor to:
    receive at least one message from an access point;
    after receiving the at least one message, perform a first extensible authentication protocol (EAP) authentication;
    after performing the first EAP authentication, perform a first bootstrapped EAP re-authentication protocol (ERP) re-authentication before a master session key (MSK) associated with the first EAP authentication expires;
    initiate a determination of whether to perform a second EAP authentication or a second bootstrapped ERP re-authentication based on whether a re-authentication Root Key (rRK) has elapsed, wherein an rRK lifetime is accessed by the processor; and
    reduce a value of the rRK lifetime when the second bootstrapped ERP re-authentication is performed and is unsuccessful.

14. The mobile device of claim 13, wherein the mobile device comprises a non-volatile memory, and wherein execution of the instructions by the processor causes the rRK lifetime to be accessed from the non-volatile memory during a provisioning of the mobile device.

15. A non-transitory processor-readable medium comprising instructions that, when executed by a processor of a mobile device, cause the processor to:
  receive at least one message from an access point;
  after receiving the at least one message, perform a first extensible authentication protocol (EAP) authentication;
  after performing the first EAP authentication, perform a first bootstrapped EAP re-authentication protocol (ERP) re-authentication before a master session key (MSK) associated with the first EAP authentication expires;
  determine whether to perform a second EAP authentication or a second bootstrapped ERP re-authentication based on whether a re-authentication Root Key (rRK) lifetime has elapsed, wherein the rRK lifetime is stored in a non-volatile memory within the mobile device;
  initiate the second bootstrapped ERP re-authentication instead of the second EAP authentication;
  determine that the second bootstrapped ERP re-authentication is unsuccessful; and
  reduce a value of the rRK lifetime in response to determining that the second bootstrapped ERP re-authentication is unsuccessful.

16. The non-transitory processor-readable medium of claim 15, wherein execution of the instructions further causes the processor to access the rRK lifetime in the non-volatile memory during a provisioning of the mobile device.

17. The non-transitory processor-readable medium of claim 15, wherein the processor is further caused to:
  initiate a third bootstrapped ERP re-authentication;
  determine that the third bootstrapped ERP re-authentication is unsuccessful; and
  in response to determining that the third bootstrapped ERP re-authentication is unsuccessful, change the value of the rRK lifetime.

18. A mobile device comprising:
  a non-volatile memory storing a re-authentication Root Key (rRK) lifetime;
  a processor; and
  a second memory storing instructions executable by the processor to:
    receive at least one message from an access point;
    after receiving the at least one message, perform a first extensible authentication protocol (EAP) authentication;
    after performing the first EAP authentication, perform a first bootstrapped EAP re-authentication protocol (ERP) re-authentication before a master session key (MSK) associated with the first EAP authentication expires;
    determine whether to perform a second EAP authentication or a second bootstrapped ERP re-authentication based on whether the rRK has elapsed;
    initiate the second bootstrapped ERP re-authentication instead of the second EAP authentication;
    determine that the second bootstrapped ERP re-authentication is unsuccessful; and
    reduce a value of the rRK lifetime in response to determining that the second bootstrapped ERP re-authentication is unsuccessful.

19. The mobile device of claim 18, wherein execution of the instructions by the processor causes the rRK lifetime to be accessed from the non-volatile memory during a provisioning of the mobile device.

20. The mobile device of claim 18, wherein the instructions further are executable by the processor to:
  initiate a third bootstrapped ERP re-authentication;
  determine that the third bootstrapped ERP re-authentication is unsuccessful; and
  in response to determining that the third bootstrapped ERP re-authentication is unsuccessful, change the value of the rRK lifetime.

* * * * *